United States Patent [19]

Miller

[11] 4,124,754

[45] Nov. 7, 1978

[54] POLYMERIZATION PROCESS WITH SUBSEQUENT PEPTIZATION

[75] Inventor: Kenneth L. Miller, Louisville, Ky.

[73] Assignee: E. I. Du Pont de Nemours and Company, Wilmington, Del.

[21] Appl. No.: 750,392

[22] Filed: Dec. 14, 1976

[51] Int. Cl.$^2$ .................... C08F 2/24; C08F 36/18
[52] U.S. Cl. ................... 526/220; 526/30; 526/295
[58] Field of Search .............. 260/79.5 C, 29.7; 526/30, 220, 295

[56] References Cited

U.S. PATENT DOCUMENTS

| 3,318,832 | 5/1967 | Sparks | 260/29.7 |
| 3,397,173 | 8/1968 | Collette | 260/45.9 |
| 3,595,847 | 7/1971 | Mayer-Mader | 526/295 X |

FOREIGN PATENT DOCUMENTS 959,122  5/1964  United Kingdom ............ 526/295

Primary Examiner—Christopher A. Henderson, Jr.

[57] ABSTRACT

A process for making sulfur-modified neoprenes, wherein chloroprene, which may be mixed with up to 20 weight percent of another unsatuated, organic monomer, is polymerized in an aqueous, alkaline emulsion in the presence of about 0.25–0.45 part of sulfur per 100 parts of total organic monomer to a conversion of at most 74%; peptization is initiated by adding to the resulting latex 0.3–1.5 parts of tetraethylthiuram disulfide or another tetraalkylthiuram disulfide, then adding sodium dibutyldithiocarbamate or another water-soluble dialkyldithiocarbamate in a ratio to tetraethylthiuram disulfide of at least 0.8:1; and peptization is contained until it is about 85–95% complete. The polymer then is isolated. Neoprenes made by this process have, when vulcanized, outstanding heat and flex resistance and superior tensile properties, tear strength, and compression set.

10 Claims, 1 Drawing Figure

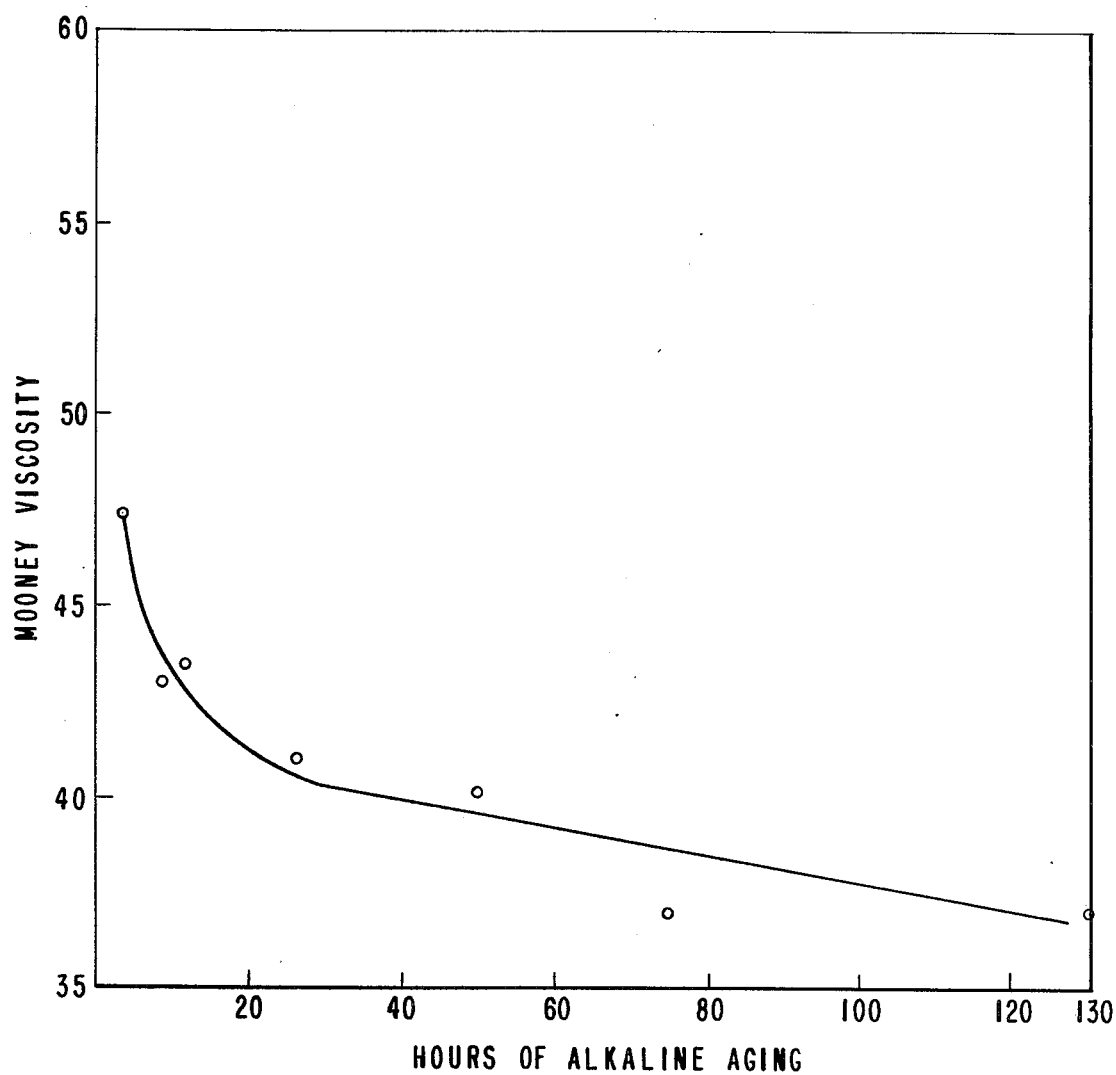

POLYMERIZATION PROCESS WITH SUBSEQUENT PEPTIZATION

BACKGROUND OF THE INVENTION

This invention is directed to novel sulfur-modified chloroprene polymers, which have excellent mechanical properties and processability.

Sulfur-modified chloroprene polymers are well known and are available commercially under the trade designation Neoprene G. They are made by polymerization of chloroprene or copolymerization of chloroprene with another unsaturated organic monomer in the presence of elemental sulfur. The polymer, as made, contains sulfur atoms in its chain as well as sulfur bridges between different chains, so that it can be properly described as a highly crosslinked chloroprene/sulfur copolymer or chloroprene/organic monomer/sulfur copolymer. Because of its crosslinked structure, this polymer cannot be processed directly but must first be broken down to lower molecular weight. This step, known as peptization, is normally accomplished by treating polymer latex with a tetraalkylthiuram disulfide, sometimes in combination with a sodium dialkyl dithiocarbamate. Preparation and peptization of sulfur-modified chloroprene polymers is described, for example, in the following U.S. Pat. Nos. 2,234,215 (Youker); 3,595,847 (Mayer-Mader); and 3,920,623 (Khan).

In the commercially available G-type neoprenes, the amount of sulfur usually is in the upper portion of the 0.2–0.6 phr range. This introduces a rather large number of sulfur bridges, but opening of those bridges in the peptization process can give a product having fairly low molecular weight. Usually, it is desired to produce a polymer having a molecular weight above the theoretical minimum, and peptization is stopped before it is complete. The peptized polymer latex may have to be stored before the polymer can be isolated, preferably under conditions which would not lead to further molecular weight changes, such as further drop of molecular weight due to continuing peptization or increase of molecular weight due to crosslinking. Such undesirable changes affect both the processability and the mechanical properties of the polymer.

There is a need for a sulfur-modified chloroprene polymer which is resistant to viscosity changes on storage of its latex, which can be vulcanized in conventional manner, and which possesses in its vulcanized state good mechanical properties.

SUMMARY OF THE INVENTION

According to this invention, there is now provided an improvement in the process for making a sulfur-modified polymer of chloroprene or copolymer of chloroprene with another unsaturated, organic monomer, the proportion of such organic monomer being at most 20 weight percent of chloroprene;

said improvement comprising conducting the polymerization or copolymerization in an aqueous, alkaline emulsion in the presence of about 0.25–0.45 part of sulfur per 100 parts by weight of the total organic monomer or monomers present to a conversion of at most 74%; terminating the polymerization and initiating peptization by addition of a tetraalkylthiuram disulfide equivalent to about 0.3–1.5 parts of tetraethylthiuram disulfide; adding to the latex a water-soluble dialkyldithiocarbamate in an amount equivalent to sodium dibutyldithiocarbamate in a weight ratio to the tetraalkylthiuram disulfide equivalent to tetraethylthiuram disulfide of at least 0.8:1, and continuing the peptization until it is about 85–95% complete; and isolating the polymer.

THE DRAWING

The drawing is a plot of Mooney viscosity of the polymer of Example 1 versus the time, in hours, of alkaline aging, under peptization conditions of Example 1.

DETAILED DISCUSSION OF THE INVENTION

The polymers obtained by the process of the present invention are curable with zinc oxide and magnesium oxide. The cured polymers have outstanding heat flex resistance and superior tensile properties, tear strength, an compression set. This is quite unexpected in view of the fact that these polymers contain much less sulfur than the usual commercial G-type neoprenes. Sulfur concentration of 0.3–0.4 part per 100 parts of organic monomers is preferred because it gives a polymer having bulk viscosity within a range that can be readily handled by conventional rubber processing equipment. While the polymerization can be carried out conveniently within the temperature range of about 10°–60° C., polymers prepared at temperatures above 40° C. have an improved resistance to crystallization.

The initial concentration of total organic monomers in the polymerization emulsion normally will be about 30–55% by weight. Organic monomers which can be copolymerized with chloroprene include, for example, styrene, vinyltoluenes, vinylnaphthalenes, 1,3-butadiene, isoprene, 2,3-dimethyl-1,3-butadiene, 2,3-dichloro-1,3-butadiene, methyl vinyl ether, vinyl acetate, methyl vinyl ketone, ethyl acrylate, methyl methacrylate, methacrylamide, and acrylonitrile.

Emulsifying agents are the water-soluble salts, particularly the sodium and potassium salts, of rosins or rosin derivatives, such as wood rosin, tall oils rosin, disproportioned rosins, or partially polymerized rosin. Unmodified wood rosin is preferred because it accelerates the subsequent peptization and eventual vulcanization. Salts of the rosins are conveniently formed during emulsification by in situ reaction of the acid form of the rosin dissolved in the monomer solution with caustic dissolved in the water solution. Usually about 3–5 parts of the rosin per 100 parts of total monomer is employed, and a sufficient excess of caustic is used to make the pH of the starting emulsion about 11–13. It is desirable to have in the emulsion at least some acid-stable dispersing agents, such as, for example, water-soluble salts of long chain aliphatic or polycyclic aromatic sulfonic acids and water-soluble salts of long chain alcohol sulfates. Especially preferred are sodium salts of the condensation products of formaldehyde and a naphthalenesulfonic acid (for example, Lomar ® PW of Nopco Chemical Division).

The monomer conversion preferably is not over 71%, but in any event should not exceed 74% because polymers obtained at higher conversions have inferior processing characteristics as evidenced by rough extrudates having high die swell. It is preferred to avoid conversions below 60%. While the lower conversion limit is not critical, it becomes increasingly difficult and expensive to recover unchanged monomer and to isolate the polymer from dilute latices obtained at those low conversions.

Any lower tetraalkylthiuram disulfide can be used to stop polymerization and initiate peptization. Since not all thiuram disulfides are equally active, it is customary to express the thiuram disulfide concentration in terms of activity of tetraethylthiuram disulfide. Equivalency curves can be readily obtained by one skilled in the art from simple experiments. The preferred concentration of thiuram disulfide is the equivalent of 0.8–1.2 tetraethylthiuram disulfide per 100 parts of total organic monomer in the initial emulsion. The thiuram disulfide can be conveniently added, for example, as a toluene solution emulsified in water.

The amount of thiuram disulfide in the polymer strongly influences scorch resistance, cure rate and vulcanizate modulus. As the amount is increased, all three increase. The preferred amount of thiuram disulfide gives a desirable balance of cure rate, vulcanizate modulus, and scorch resistance.

At the same time as the thiuram disulfide is added, it is preferred that a free radical scavenger that does not react with the sulfide linkages of the chloroprene-sulfur copolymer be added to the latex. Representative free radical scavengers include phenothiazine, dihydric phenols, aralkyl derivatives thereof, and phenolic anti-oxidants substituted in at least one position ortho to the hydroxy group with a branched alkyl group containing 3–12 carbon atoms. Representative examples are hydroquinone, 2,5-di-tert-butylhydroquinone, 2,5-di-tert-amylhydroquinone, 4-tert-butylpyrocatechol, 4,4'-thiobis(6-tert-butyl-o-cresol), 4,4'-methylenebis(2,6-di-tert-butylphenol), 2,6-di-tert-butyl-$\alpha$-(methylamino)-p-cresol, 4,4'-thiobis(6-tert-butyl-m-cresol), and 2,6-di-tert-butyl-4-phenylphenol.

The water-soluble dialkyl dithiocarbamate, which is next added to the polymer latex (preferably, as an aqueous solution), acts together with the thiuram disulfide to peptize the polymer within the latex as it ages. The degree of completion of peptization is determined as described below in Example 1. To achieve the desired degree of peptization, it is necessary to use an amount of the dithiocarbamate equivalent to at least 0.7 part of sodium dibutyl dithiocarbamate, preferably 0.8–1.2 parts. It is not economically practical to use more than 1.5 parts since no additional effect is obtained. Sodium dibutyl dithiocarbamate is chosen as the standard dialkyl dithiocarbamate, and equivalent amounts of other dialkyl dithiocarbamates (that is, amounts having equivalent activity) are obtained experimentally in a simple manner.

Tetraalkylthiuram disulfides and water-soluble dialkyldithiocarbamates useful in the practice of this invention are those in which the alkyl groups attached to the nitrogen atoms are acyclic alkyl groups, or where the two alkyl groups attached to the same nitrogen atom are connected to form an $\alpha,\omega$-alkylene group. Representative $\alpha,\omega$-alkylene groups include pentamethylene and hexamethylene, while representative alkyl groups include methyl, ethyl, butyl, and octyl. Typical compounds include, for example, dipentamethylenethiuram disulfide, tetramethylthiuram disulfide, sodium dioctyldithiocarbamate, and sodium dibutyldithiocarbamate.

The polymer peptization rate is dependent on the latex pH and temperature. Normally, this step will be carried out at about 15°–50° C., but the usual ambient temperature of about 23°–27° C. is preferred. The peptization rate increases with pH. The minimum practical pH is about 10, but the range of about 11–12.3 is preferred. At the preferred temperature and latex pH, and with the preferred amounts of tetraalkylthiuram disulfide and dithiocarbamate, a degree of peptization within the 85–95% range can usually be obtained in 10–30 hours.

Unchanged monomer can be stripped from the polymer latex anytime during the peptization step, as described below in Example 1, the stripping time being counted as peptization time. As soon as the monomer has been removed, the latex is immediately cooled to the peptization temperature. The polymer obtained by the process of the present invention is superior to conventional sulfur-modified chloroprene polymers in that it has a much greater viscosity stability during storage of the peptized latex. From the standpoint of production advantages, this means better viscosity control from lot to lot and greater freedom in scheduling polymer isolation. The polymer isolation is most conveniently effected by freeze-drying, as described in Example 1 below.

The chloroprene polymers of this invention have a Mooney viscosity of 35–60, preferably 45–55. They can be vulcanized in vulcanization systems normally used for sulfur-modified chloroprene polymers as readily as conventional sulfur-modified chloroprene polymers containing twice as much sulfur. The vulcanizates have excellent mechanical properties.

This invention is now illustrated by examples of certain representative embodiments thereof, where all parts, proportions, and percentages are by weight unless otherwise indicated.

EXAMPLE 1

Polymer 1.

Chloroprene is polymerized in an aqueous, alkaline emulsion comprised of a solution of 0.32 part of sulfur in 100 parts of chloroprene, 4 parts of wood rosin as the sodium salt, 0.56 part of the sodium salt of a formaldehydenaphthalene sulfonic acid condensation product, and $4 \times 10^{-5}$ part of copper ion. Polymerization is carried out in a nitrogen-blanketed, agitated, glass-linked kettle as 45° C. by incremental addition of an aqueous solution of 5% potassium persulfate and 0.125% sodium anthraquinonesulfonate. After 69% of the chloroprene has been converted to polymer in about 2.5 hours, the polymerization is stopped by addition of an aqueous emulsion of a toluene solution of 0.04 part of 4,4'-thiobis-(2-methyl-6-t-butylphenol) and 1.10 parts of tetraethylthiuram disulfide stabilized with sodium lauryl sulfate and the sodium salt of a condensate of formaldehyde with naphthalenesulfonic acid. The polymerized emulsion is cooled to 25° C., treated with 0.94 part of sodium dibutyldithiocarbamate as a 47% aqueous solution, and allowed to age to effect peptization of the polymer. After an aging period of approximately 2 hours at 25° C., unpolymerized chloroprene is stripped from the polymerized emulsion using steam in a turbanular flow tube, as described in U.S. Pat. No. 2,467,679. The resulting latex, containing about 41% nonvolatile solids and having a pH of about 12, is cooled to 25° C. Aging is continued for a total of 22–26 hours. The latex is acidified to a pH of 5.6 with 30% aqueous acetic acid, and polymer is isolated from a portion of the latex by continuously freezing a thin layer of the latex as described in U.S. Pat. No. 2,187,146 and washing and drying the resulting polymer film. The polymer shows a degree of peptization of 90% as determined by the method described below and has a Mooney viscosity of 41. Samples similarly isolated from other portions of the latex after different intervals during a total of 130 hours aging show, in FIG. 1, that peptization has resulted during approximately the first 20 hours in a product having such a low Mooney viscosity that it declined no more than 4 additional points during the subsequent 110 hours.

Mooney viscosity is determined according to ASTM Method D1646. The large rotor is used at 100° C. and the viscosity after a 2.5 minute interval is recorded.

DETERMINATION OF DEGREE OF PEPTIZATION

Degree of peptization is expressed in terms of percentage of the ultimate peptization attainable as determined by the following method.

The plasticity number, $a$, of a first polymer sample, which is $x$, percent peptized, is determined by ASTM Test Method D926 at 80° C. The plasticity number, $b$, of a second polymer sample which is identical to the first except that during its preparation the polymerized emulsion was not subjected to peptizing conditions in the presence of any peptizing agents is determined by the same method.

A 200 g. specimen of the first polymer sample is masticated on a 4 in. × 8 in. rubber mill with 1% of tetraethylthiuram disulfide and 2% of piperidinium pentamethylene dithiocarbamate (Accelerator 552) for 5 minutes at 100° C. The plasticity number, $c$, is determined as above and is defined as being representative of the ultimate degree of peptization.

Percentage of peptization, $x$, is defined by the equation, $$x = \frac{b - a}{b - c} \times 100.$$

Polymers of this invention are 85–95% peptized by this determination.

COMPARISON POLYMER A

A mixture of 98 parts of chloroprene and 2 parts of 2,3-dichloro-1,3-butadiene containing 0.6 part of dissolved sulfur is polymerized at 40° C. in aqueous, alkaline emulsion by the above-described procedure. When the conversion of total monomers reaches 86%, the polymerization is terminated by addition of an aqueous emulsion of a toluene solution of 0.4 part of tetraethylthiuram disulfide, 0.02 part of 4,4'-thiobis(6-tert.-butyl-o-cresol), and 0.04 part of 2,6-di-tert.-butyl-4-phenyl-phenol. The polymerized emulsion is cooled to 25° C. and 0.38 part of sodium dibutyldithiocarbamate is added. After 3 hours aging at 25° C. following the addition of the dithiocarbamate, the unpolymerized monomers are stripped from the emulsion, and the resultant latex, having a nonvolatile solids content of about 42% and a pH of about 12, after a total of 18 hours aging is treated with an additional 0.9 part of tetraethylthiuram disulfide, acidified and the polymer isolated as described in Example 1. The isolated polymer is 72% peptized and has a Mooney viscosity of 50.

Samples of the above polymers are compounded using the following recipe.

| | Parts by Weight |
|---|---|
| Polymer | 100 |
| Stearic Acid | 0.5 |
| N-Phenyl-1-naphthylamine | 2 |
| Magnesium Oxide | 4 |
| Zinc Oxide | 5 |
| Process Oil ("Mobilsol" K Oil, Mobil Oil Co.) | As Shown |
| Carbon black - SRF | As Shown |
| Carbon black - FEF | As Shown |
| Benzothiazyl disulfide | As Shown |

Samples of the compounded stock are vulcanized in a mold under pressure for 30 minutes at 153° C.

Tear strength is measured by ASTM Method D470 and is reported as pounds per inch.

Flex resistance is measured by ASTM Method D813 and is reported as the number of flexes required to reach a crack length of 0.5 inch.

Tensile properties are measured by ASTM Method D412.

Compression set is measured by ASTM Method D395, Method B, using a heat treatment of 22 hours at 70° C.

Table I shows the results of testing the vulcanizates, both original and aged. The following abbreviations are used for the tensile properties.

$M_{100}$ — tensile stress at 100% elongation, psi
$T_B$ — tensile strength, psi
$E_B$ — ultimate elongation, %

TABLE I

| | Example 1(a) | | Example 1(b) | |
|---|---|---|---|---|
| Polymer | 1 | A | 1 | A |
| Process Oil | 5 | 5 | 52 | 54 |
| SRF Black | 26 | 26 | 150 | 150 |
| FEF Black | 26 | 26 | | |
| Benzothiazyl disulfide | 2.5 | 2.5 | | |
| Original | | | | |
| Tensile Properties | | | | |
| $T_B$ | 2960 | 2740 | 1700 | 1300 |
| $E_B$ | 480 | 440 | 180 | 220 |
| $M_{100}$ | 600 | 625 | 925 | 680 |
| Tear Strength | 410 | 390 | 200 | low |
| Compression Set | 31 | 36 | 40 | 48 |
| Aged 3 days/121° C | | | | |
| Tensile Properties | | | | |
| $T_B$ | 2950 | 2625 | 1460 | 1425 |
| $E_B$ | 410 | 300 | 150 | 140 |
| $M_{100}$ | 775 | 1000 | 1175 | 1210 |
| Flex Resistance cycles × $10^{-5}$ | 9.0 | .005 | <0.015 | <0.015 |
| $M_{100}$ Aged/$M_{100}$ Orig. | 1.29 | 1.60 | 1.27 | 1.78 |
| $E_B$ Aged/$E_B$ Orig. | .85 | .68 | .83 | .64 |

EXAMPLE 2

Polymer 2

Chloroprene is polymerized as in Example 1 in the presence of 0.31 part of sulfur. Polymerization is stopped at 71.2% conversion by addition of an aqueous emulsion of a toluene solution of 0.032 part of 4,4'-thio-bis-(2-methyl-6-t-butylphenol) and 0.8 part of tetraethylthiuram disulfide. The polymerized emulsion is treated with 0.85 part of sodium dibutyldithiocarbamate prior to the aging period. The isolated polymer has a degree of peptization about equal to that of Polymer 1 and a Mooney viscosity of 52.5.

COMPARISON POLYMER B

A solution of 0.6 part sulfur in 100 parts of chloroprene is polymerized in aqueous, alkaline emulsion at 40° C. by the procedure of Example 1. Polymerization is stopped at 88% conversion of the chloroprene by addition of an aqueous emulsion of a toluene solution of 0.4 part of tetraethylthiuram disulfide, 0.14 part of N-phenyl-1-naphthylamine, and 0.02 part of 4,4'-thiobis(6-tert-butyl-o-cresol). The polymerized emulsion is cooled to 25° C., treated with 0.34 part of sodium dibutyldithiocarbamate, aged, treated with 0.9 part of additional tetraethylthiuram disulfide, and stripped of unreacted chloroprene as described for Comparison Polymer A. Polymer isolated from the latex as described in Example 1 is 70% peptized and has a Mooney viscosity of 57.

COMPARISON POLYMER C

A chloroprene polymer is prepared according to the process disclosed in U.S. Pat. No. 3,920,623 by polymerizing an aqueous emulsion of chloroprene monomer using the following recipe:

|  | Parts |
|---|---|
| Chloroprene | 100 |
| Nancy wood rosin | 4 |
| Sulfur | 0.31 |
| Water | 107 |
| Sodium hydroxide | 0.7 |
| Sodium salt of condensate of formaldehyde and a naphthalene-sulfonic acid[1] | 0.7 |
| Copper ion[2] | 0.00004 |

[1] "Lomar" PW, Nopco Chemical Co.
[2] Added as copper sulfate

Polymerization is carried out at 40° C. to a monomer conversion of about 73% by the addition of a catalyst which is a 5% aqueous solution of potassium persulfate containing about 0.125% sodium 2-anthraquinonesulfonate.

Polymerization is stopped by adding 9.27 parts of an emulsion which provides 2 parts of 2-(morpholinothio)-benzothiazole per 100 parts of monomer. The emulsion is prepared from the following components:

|  | Parts |
|---|---|
| Water | 28.6 |
| Toluene | 26.3 |
| tris-(5-Norbornene-2-methyl)phosphite | 10.9 |
| 2-(Morpholinothio)benzothiazole | 21.6 |
| Sodium lauryl sulfate | 5.6 |
| Sodium salt of condensate of formaldehyde and naphthalene-sulfonic acid | 1.3 |
| 4,4'-Thiobis(6-tert-butyl-o-cresol) | 3.5 |
| Phenothiazine | 1.1 |
| p-tert-Butylcatechol | 1.2 |

After the addition of the above emulsion, 1.29 parts of sodium dibutyldithiocarbamate is added as a 47% solution in water and the emulsion is maintained at 40° C. for 4 hours. Then the unreacted monomer is removed as described in Example 1, and the latex is cooled to 25° C. The latex is stored at ambient temperature for 11 hours following the removal of monomer and then acidified to a pH of 5.6 by the addition of 30% aqueous acetic acid. The polymer is isolated by freezing the latex as described in Example 1, and is peptized to essentially the same degree as that of Polymer 1 and has a Mooney viscosity of 53.

Samples of polymers prepared in Example 2 and Comparative Examples B and C are compounded with the following recipe:

|  | Parts |
|---|---|
| Polymer | 100 |
| Stearic acid | 1 |
| Octylated diphenylamines[1] | 2 |
| Magnesium oxide | 4 |
| Carbon black - SRF | 22 |
| Carbon black - FEF | 22 |
| Process Oil ("Sundex" 790, Sun Oil Co.) | 5 |
| Zinc oxide | 5 |
| Resotropin | As shown |

[1] "Antox" N Rubber Antioxidant, E. I. du Pont de Nemours & Co.

Samples of the compounded stocks are vulcanized in a mold under pressure for 20 minutes at 160° C. Physical properties of the vulcanizates are shown in Table II (E 5730: pp. 132, 133, 138, 139).

TABLE II

| Polymer | Example 2(a) | | Example 2(b) | |
|---|---|---|---|---|
|  | 2 | B | 2 | C |
| Resotropin | — | — | 0.5 | 0.5 |
| Original | | | | |
| Tensile Properties | | | | |
| $T_B$ | 3540 | 3180 | 3360 | 3150 |
| $E_B$ | 440 | 410 | 360 | 480 |
| $M_{100}$ | 560 | 610 | 680 | 470 |
| Tear Strength | 48 | 38 | 35 | 61 |
| Compression Set | 42 | 59 | 40 | 54 |
| Flex Resistance, Cycles $\times 10^{-5}$ | .675 | .135 | < .045 | Not Run[a] |
| Aged 7 Days/121° C | | | | |
| Tensile Properties | | | | |
| $T_B$ | 2840 | 2680 | 2770 | 2820 |
| $E_B$ | 210 | 160 | 180 | 260 |
| $M_{100}$ | 1400 | 1600 | 1510 | 1150 |
| $E_B$ Aged/$E_B$ Orig. | .48 | .39 | .50 | .54 |
| $M_{100}$ Aged/$M_{100}$ Orig. | 2.50 | 2.62 | 2.22 | 2.45 |

[a] believed to be higher than of Polymer 2

EXAMPLE 3

Polymer 3

A solution of 0.31 part of sulfur in 100 parts of chloroprene is polymerized in aqueous, alkaline emulsion by the procedure of Example 1. Polymerization is stopped at 69% conversion by addition of 0.03 part of 4,4'-thiobis-(2-methyl-6-t-butylphenyl) and 0.8 part of tetraethylthiuram disulfide. The polymerized emulsion is cooled to 25° C., treated with 0.9 part of sodium dibutyldithiocarbamate, and aged and stripped of unreacted chloroprene as described in Example 1. Polymer, isolated as described in Example 1, has a Mooney viscosity of 52 and is peptized to essentially the same extent as Polymer 1.

COMPARISON POLYMER D

A solution of 0.6 part of sulfur in 100 parts of chloroprene is polymerized in aqueous, alkaline emulsion at 40° C. by the procedure of Example 1. Polymerization is stopped at 85% conversion by addition of an aqueous emulsion of a toluene solution of 0.4 part of tetraethylthiuram disulfide, and 0.02 part of 4,4'-thiobis(6-tert-butyl-o-cresol). The polymerized emulsion is cooled to 25° C., treated with 0.34 part of sodium dibutyldithiocarbamate, aged and stripped of unreacted chloroprene as described in Comparative Example A. Polymer is isolated as described in Example 1 except that the 0.9 part additional tetraethylthiuram disulfide in the above described emulsion is added just before the latex is acidified. The dried polymer is 73% peptized and has a Mooney viscosity of 49.

Samples of Polymer 3 and Comparison Polymer D are compounded using the following recipe:

| | Parts |
|---|---|
| Polymer | 100 |
| Stearic acid | 1 |
| Octylated diphenylamine ("Octamine", Uniroyal Inc.) | 2 |
| Magnesium oxide | 4 |
| Carbon black - SRF | 58 |
| Process oil ("Sundex" 790, Sun Oil Co.) | 10 |
| Zinc oxide | 5 |

Physical properties of samples of the compounded stocks vulcanized for 30 minutes at 153° C. are shown in Table III.

TABLE III

| Polymer | 3 | D |
|---|---|---|
| Original | | |
| Tensile Properties | | |
| $T_B$ | 3070 | 2700 |
| $E_B$ | 390 | 360 |
| $M_{100}$ | 740 | 680 |
| Tear Strength | 390 | 330 |
| Compression Set | 21 | 30 |
| Flex Resistance, Cycles $\times 10^{-5}$ | 13.5 | 8.55 |
| Aged 3 Days/121° C | | |
| Tensile Properties | | |
| $T_B$ | 2835 | 2560 |
| $E_B$ | 300 | 250 |
| $M_{100}$ | 920 | 1140 |
| $E_B$ Aged/$E_B$ Orig. | .77 | .76 |
| $M_{100}$ Aged/$M_{100}$ Orig. | 1.24 | 1.68 |

Samples of Polymer 3 and Comparison Polymers A and B are compounded according to the following recipe:

| | Parts |
|---|---|
| Polymer | 100 |
| Stearic acid | 1 |
| Octylated diphenylamines ("Antox" N Rubber Antioxidant, E. I. du Pont de Nemours & Co.) | 2 |
| Magnesium oxide | 4 |
| Zinc oxide | 5 |
| Process oil ("Sundex" 790, Sun Oil Co.) | 10 |
| Carbon black - SRF | 58 |
| Benzthiazyl sulfide | As Shown |

Physical properties of the compounded stocks vulcanized 20 minutes at 160° C. are shown in Table IV.

TABLE IV

| | Example 3(a) | | Example 3(b) | | |
|---|---|---|---|---|---|
| Polymer | 3 | B | 3 | A | B |
| Benzthiazyl Disulfide | 1 | 1 | — | — | — |
| Original | | | | | |
| Tensile Properties | | | | | |
| $T_B$ | 3040 | 2730 | 3110 | 3020 | 3000 |
| $E_B$ | 420 | 420 | 330 | 370 | 340 |
| $M_{100}$ | 500 | 470 | 680 | 590 | 610 |
| Tear Strength | 320 | 297 | 306 | 275 | 264 |
| Compression Set | 49 | 75 | 33 | 61 | 55 |
| Flex Resistance, Cycles $\times 10^{-5}$ | 5.6 | 4.25 | .99 | .52 | .16 |
| Aged 7 Days/121° C | | | | | |
| Tensile Properties | | | | | |
| $T_B$ | 2970 | 2950 | 3020 | 2950 | 2950 |
| $E_B$ | 190 | 160 | 170 | 140 | 130 |
| $M_{100}$ | 1690 | 1940 | 1850 | 2140 | 2360 |
| $E_B$ Aged/$E_B$ Orig. | .45 | .38 | .52 | .38 | .38 |
| $M_{100}$ Aged/$M_{100}$ Orig. | 3.38 | 4.13 | 2.72 | 3.63 | 3.87 |

The data in Tables I-IV illustrate the superiority of polymers made by the process of this invention over those of Comparison Polymers A, B and D with respect to vulcanizate tensile strength, tear strength, compression set, flex resistance, and resistance to heat aging as measured by percent change in tensile stress at 100% elongation and ultimate elongation. In addition, the polymer of this invention is shown to excel over that of Comparison Polymer C in regard to original tensile strength, compression set, heat aging resistance of the vulcanizates as measured by percent change in tensile stress at 100% elongation, and in curing response as indicated by the tensile modulus at 100% elongation after a given cure time.

I claim:

1. In a process for polymerizing chloroprene or copolymerizing chloroprene with up to 20 weight percent of another organic, unsaturated monomer, based on the weight of chloroprene, in the presence of elemental sulfur, the improvement of conducting the polymerization or copolymerization in the absence of chain transfer agents in an aqueous, alkaline emulsion in the presence of 0.25-0.45 part of sulfur per 100 parts of the total organic monomer or monomers present to a conversion of at most 74%; terminating the polymerization and initiating peptization by addition to the resulting polymer latex of a tetraalkylthiuram disulfide equivalent to 0.3-1.5 parts of tetraethylthiuram disulfide; all parts being by weight; adding a water-soluble dialkyldithiocarbamate in an amount equivalent to sodium dibutyldithiocarbamate in a weight ratio to the tetraalkylthiuram disulfide equivalent to tetraethylthiuram disulfide of at least 0.8:1, and continuing the peptization until it is about 85-95% complete; and isolating the polymer.

2. A process of claim 1 wherein the proportion of sulfur is 0.3-0.4 part per 100 parts by weight of the total organic monomer or monomers.

3. The process of claim 1 wherein the polymerization temperature is about 10°-60° C.

4. The process of claim 3 wherein the polymerization temperature is above 40° C.

5. The process of claim 1 wherein the initial concentration of total organic monomers in the polymerization emulsion is 30-55% by weight.

6. The process of claim 1 wherein the monomer conversion is at most 71% and at least 60%.

7. The process of claim 1 wherein the proportion of tetraalkylthiuram disulfide added to the polymer latex is equivalent to 0.8-1.2 tetraethylthiuram disulfide per 100 parts of total organic monomer in the initial emulsion.

8. The process of claim 1 wherein the peptization step is carried out at 23°-27° C.

9. The process of claim 1 wherein the peptization step is carried out at a pH of at least 10.

10. The process of claim 9 wherein the peptization step is carried out at a pH of 11-12.3.

* * * * *